UNITED STATES PATENT OFFICE.

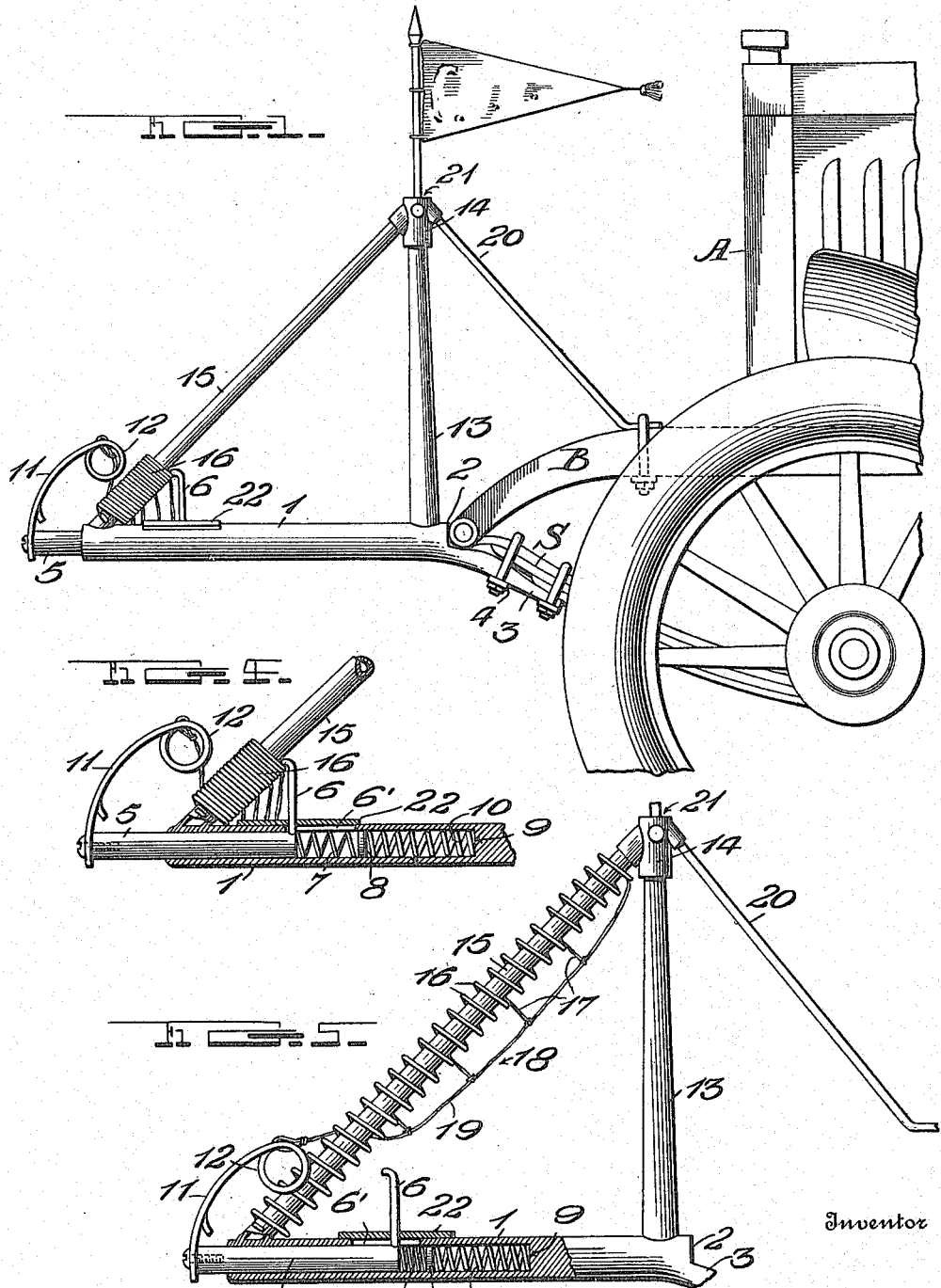

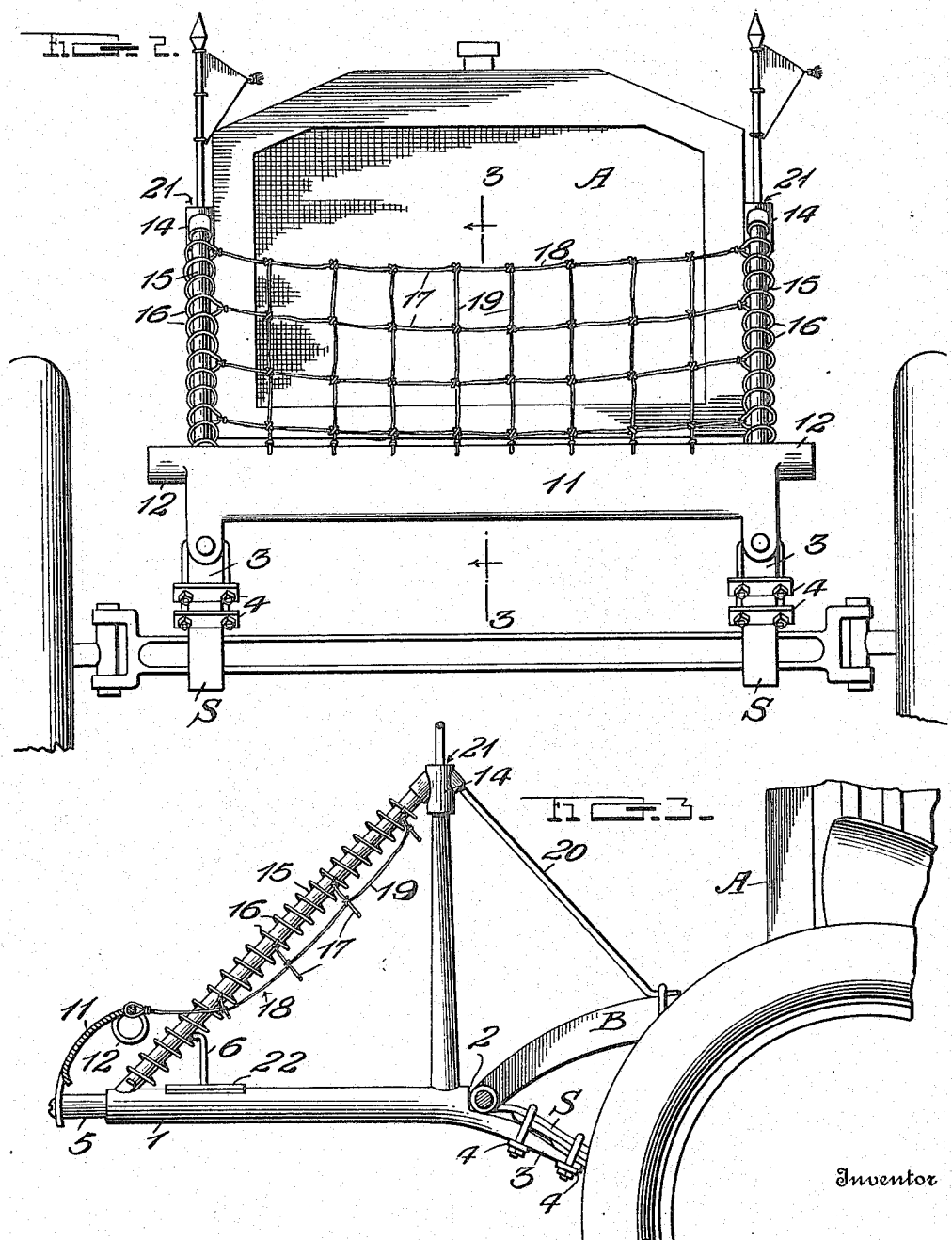

CLEBURG WESLEY KILLIAN, OF OAKLAND, CALIFORNIA.

AUTOMOBILE FENDER AND GUARD.

1,122,128.

Specification of Letters Patent.

Patented Dec. 22, 1914.

Application filed March 9, 1914. Serial No. 823,493.

*To all whom it may concern:*

Be it known that I, CLEBURG WESLEY KILLIAN, a citizen of the United States, residing at Oakland, in the county of Alameda and State of California, have invented certain new and useful Improvements in Automobile Fenders and Guards; and I do declare the following to be a full, clear, and exact description of the invention, such as will enable others skilled in the art to which it appertains to make and use the same.

This invention relates to improvements in automobile fenders and the primary object of the same is to provide a fender of the character described having a flexible net which is adapted to be extended by a shock caused by the bumper of the machine coming in contact with an object.

A secondary object is to provide simple and efficient cushioning means whereby, should said bumper strike a stationary object, the force of the shock upon the vehicle, will be gradually absorbed.

With the above and other objects in view, the invention resides in certain novel features of construction and combination herein described and claimed and shown in the drawings wherein—

Figure 1 is a side elevation of the front end of an automobile showing the application of my improved fender and guard thereto, the net being retracted; Fig. 2 is a front elevation of the parts shown in Fig. 1 with the net extended; Fig. 3 is a vertical section on the line 3—3 of Fig. 2; Fig. 4 is a side elevation partly in section of a portion of the fender removed from the vehicle, showing the position of parts when the net is retracted; and Fig. 5 is a similar view showing the position of parts after the bumper has struck an object.

In the accompanying drawings I have shown my invention as applied to an automobile A which is here shown as provided with the usual longitudinal side bars B which are curved downwardly at their forward ends and pivotally connected at P with the front springs S, here shown as of semi-elliptic formation.

Projecting forwardly from each of the bars B and springs S, is a hollow arm 1, each of said arms being provided with a suitable shoulder 2, said shoulders being adapted to abut the forward ends of said bars B and springs S while attaching plates 3 extend rearwardly from said arms and their shoulders and are rigidly secured by means of suitable clamps 4 to the springs S.

Arranged within each of the hollow arms 1 is a cylindrical plunger 5 which carries on its inner end a hook or keeper 6, said hooks projecting loosely through slots 6' through the upper portions of the bars 1. The inner ends of the plungers 5 contact with the outer ends of coil springs 7, the rear ends of said springs contacting with suitable bearing blocks 8, between which and the inner ends 9 of the bores within said arms are disposed coil springs 10 which are of less resiliency than the springs 7. The plungers 5, on the opposite sides of the machine, are connected by a suitable bumper 11 which may be of any appropriate design but which is preferably substantially semi-circular in cross section, its free ends 12 terminating in suitable ornamentations.

Rising rigidly from the rear end of each hollow arm 1 is an upright standard 13 which is secured at its upper end within a casting or head block 14 while bars 15 incline downwardly from the head blocks 14 and are rigidly secured at their lower ends to the forward ends of the arms 1.

Slidable upon each of the inclined bars 15, is a coil spring 16, said springs being connected at intervals by transverse strands 17 of a net 18, said strands being held in spaced relation by means of upright strands 19 which are rigidly secured at their lower ends to the upper edge of the bumper 11. The net 18 is normally positioned behind said bumper and, when in this position, the springs 16 are compressed and are retained in this position by the hooks 6 which are forced into contact with said springs by the action of the coil spring 7, within the arms 1.

If a pedestrian should now be struck by the bumper 11, the plungers 5 will slide inwardly against the tension of the springs 7 and the hooks 6 will be moved out of contact with the springs 16, thereby allowing said springs to expand (see Fig. 5) and travel upwardly upon the bars 15, thereby extending the net 18 in the rear of said bumper 11. It is to be understood that said bumper is disposed at a rather low point and that persons struck thereby will be thrown off their balance, and the general tendency will be for them to fall rearwardly, whereupon, they will be caught by the net 18 and little or no injuries will be incurred.

It may here be stated that the coil springs 16 are not intended to support the weight of the person thrown upon the net 18, but that they are designed to yield under said weight and thereby cause the net 18 to sag a suitable amount to prevent the person from falling off the forward end thereof.

If the bumper 11 should come in contact with an immovable object, the plungers 5 would be forced inwardly until the springs 7 are compressed to their limit and thereby forced inwardly against the blocks 8, whereupon the shock will be imparted to the springs 10, which as before stated, are of less resiliency than the springs 7. It will be clear that this operation will of course extend the net 18 but that its use is not now required, since the last described operation of the device is intended for the purpose of relieving the machine of the terrible shock which would otherwise be imparted thereto.

Minor details of construction may be varied in form, proportion and location without departing from the general principles herein set forth. Various additions may be also made to the parts above described, such as for instance, the provision of suitable braces 20, sockets 21 for the reception of flag staffs, and shields 22, which latter may be arranged to move with the hooks 6 over the slots in said bar 1.

I have shown and described my invention as applied to an automobile having semi-elliptic springs, but it will be readily understood that I need not be limited to this application. It is to be further understood that I do not wish to be limited to the application of the invention to an automobile alone, since it would operate to equal advantage with a street railway car or other moving vehicle. In other words, I do not wish to be limited to details of construction or to applications of the invention otherwise than as set forth in the appended claims.

Having thus described my invention, what I claim as new and desire to secure by Letters Patent is:

1. A device of the character described comprising a support projecting forwardly from the front of a vehicle, upwardly and rearwardly inclining guides carried by said support, coil springs engaged with said guides, a flexible net secured at its opposite edges to said springs, locking means for retaining said springs in compressed position at the lower ends of said guides, and means projecting forwardly from said support for tripping said locking means when struck by an object, whereby said springs will expand and travel upon said guides, thereby extending said net.

2. A device of the character described comprising a support projecting forwardly from the front of a vehicle, a collapsible self-projected net carried by said support and adapted to move from its normally collapsed position at the front of said supports when an object is struck, a longitudinal sliding member projecting forwardly from said support, a keeper on said member and means for yieldingly projecting said member forwardly to engage said keeper with said net and retain the same in collapsed position, whereby, said net will be released to expand when said member is moved rearwardly by contact with an object.

3. A device of the character described comprising a support projecting forwardly from the front of a vehicle, upwardly and rearwardly inclining guides carried by said support, a collapsible self-projected net movably supported between said guides, a pair of longitudinally sliding members projecting forwardly from said supports, a bumper connected at its opposite ends to said members, a keeper on each of said members, and springs for yieldingly forcing said members forwardly to engage said keepers with said net to retain the same in collapsed position, whereby, when said bumper is forced into contact with an object, said net will be free to expand between said guides.

4. A device of the character described, comprising a pair of hollow arms adapted to be secured to and project forwardly from a vehicle, said arms being provided with longitudinal slots, a plunger slidable in and projecting forwardly from the bore of each arm, a bumper connected at its opposite ends to the projecting ends of said plungers, an upwardly and rearwardly inclining guide bar rising rigidly from the forward end of each of said arms, a collapsible self-projecting net supported movably between said guide bars, a keeper on each of said plungers and projecting through said slots and a coil spring within the bore of each of said arms and in rear of said plungers, whereby said plungers and said keepers are projected forwardly, thereby retaining said keepers in contact with the collapsed net until an object is struck by said bumper.

5. A device of the character described comprising a pair of hollow arms for attachment to the front of a vehicle, bars inclining upwardly and rearwardly from said arms, the latter being provided with slots in rear of their connections with said bars, plungers slidable within said arms and projecting beyond the forward ends thereof, a bumper connected at its opposite ends to said projecting portions, a coil spring encircling each of said inclined bars; a flexible net secured at its opposite sides to said springs, a keeper on each of said plungers and projecting through said slots and means for forcing said plungers normally forward to cause said keepers to contact with and retain said springs in compressed position.

6. A device of the character described comprising a pair of arms adapted to be secured to and project forwardly from, the front of a vehicle, said arms having forwardly opening bores and longitudinal slots opening from said bores through their upper sides, a pair of springs of varied resiliency in the bore of each arm, a plunger slidable within each of said bores and projecting forwardly therefrom, a bumper connected at its opposite ends to the outer ends of said plungers, keepers on said plungers and projecting movably through said slots, guide bars inclining upwardly and rearwardly from the forward ends of said arms, coil springs encircling said bars, and a flexible net secured at its opposite sides to said springs and at its bottom to said bumper, the springs on said bars being held normally compressed by said keepers and the latter being forced forwardly by the springs in the bores of said arms.

7. A device of the character described comprising a pair of arms adapted to be secured to and project forwardly from, the front of a vehicle, said arms having forwardly opening bores and longitudinal slots opening from said bores through their upper sides, a pair of springs of varied resiliency in the bore of each arm, a plunger slidable within each of said bores and projecting forwardly therefrom, a bumper connected at its opposite ends to the outer ends of said plungers, keepers on said plungers and projecting movably through said slots, upright standards rising from the rear ends of said arms, inclined guide bars secured at their front and rear ends to the outer ends of said arms and to the upper ends of said standards, coil springs encircling said bars, and a flexible net secured at its opposite sides to said springs and at its bottom to said bumper, the springs on said bars being normally held compressed by said keepers and the latter being forced forwardly by the springs within said arms.

In testimony whereof I have hereunto set my hand in presence of two subscribing witnesses.

CLEBURG WESLEY KILLIAN.

Witnesses:
G. J. FOSTER,
H. L. HAGAN.

Copies of this patent may be obtained for five cents each, by addressing the "Commissioner of Patents, Washington, D. C."